Sept. 2, 1941.   C. J. CRETORS   2,254,271
CORN POPPING APPARATUS
Filed July 17, 1939   2 Sheets-Sheet 1
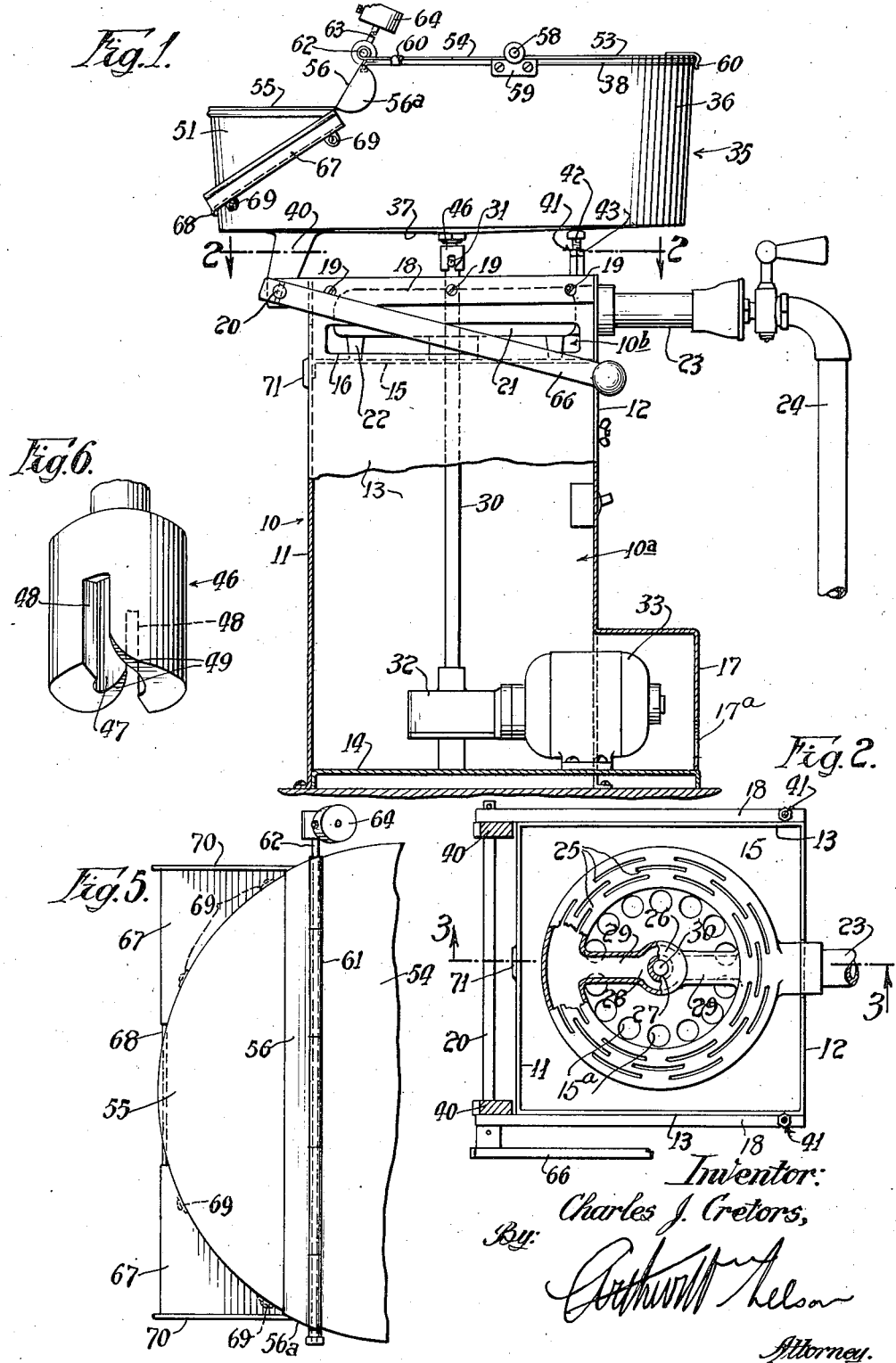
Inventor:
Charles J. Cretors,
By: Arthur W. Nelson
Attorney.

Sept. 2, 1941. C. J. CRETORS 2,254,271
CORN POPPING APPARATUS
Filed July 17, 1939 2 Sheets-Sheet 2
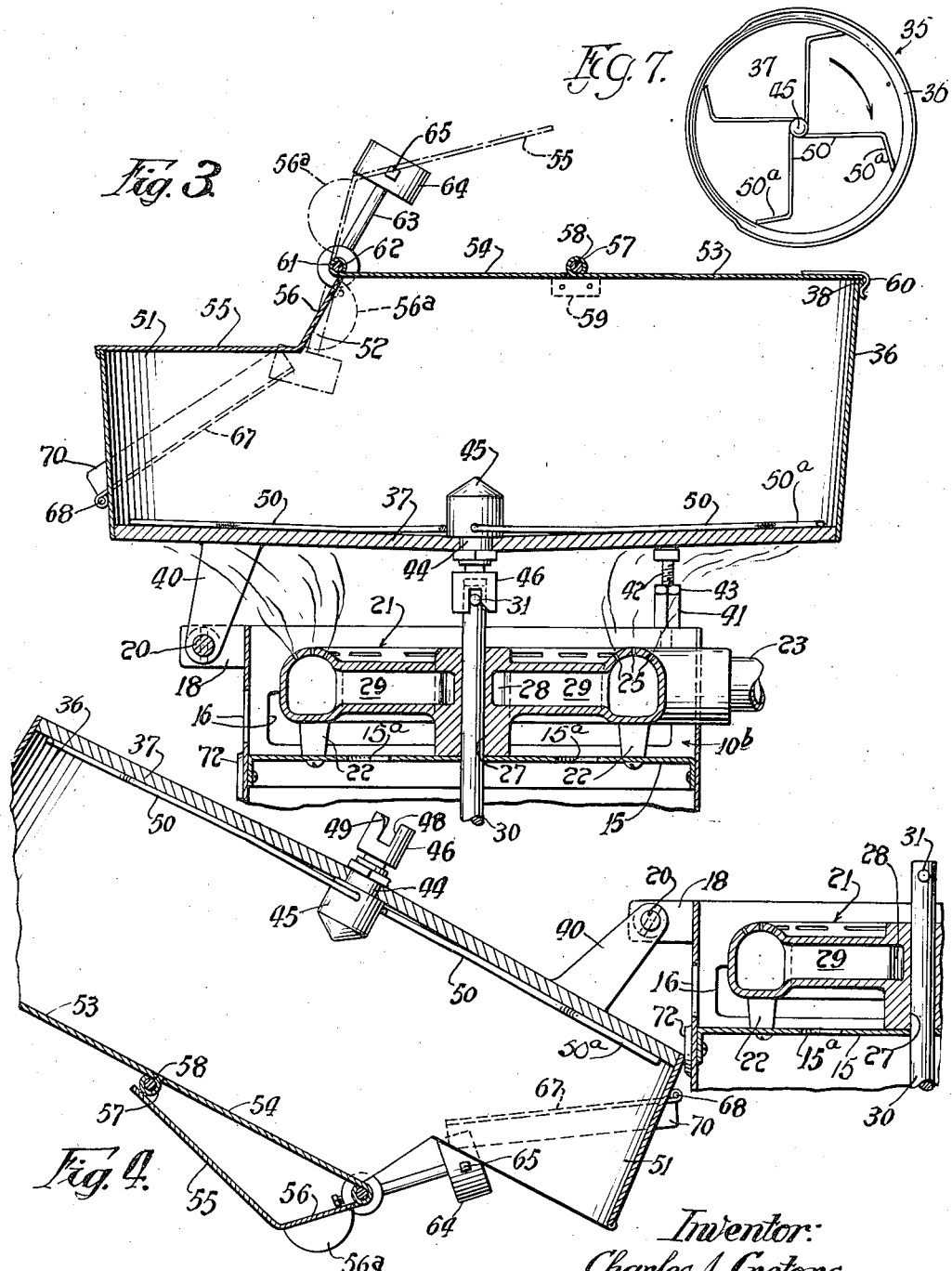
Inventor:
Charles J. Cretors,
By:
Arthur M. Nelson
Attorney.

Patented Sept. 2, 1941

2,254,271

UNITED STATES PATENT OFFICE 2,254,271

CORN POPPING APPARATUS

Charles J. Cretors, Chicago, Ill.

Application July 17, 1939, Serial No. 284,935

9 Claims. (Cl. 53—4)

This invention relates to improvements in corn popping apparatus and it consists of the matters hereinafter described and more particularly pointed out in the appended claims. The invention is more especially concerned with that type of apparatus wherein the corn is popped in a seasoning and salt, in a kettle forming a part of the apparatus.

One of the objects of the present invention is to provide a corn popping apparatus especially adapted for use in wholesale popped corn establishments and which apparatus is fast, sturdy, durable and dependable for the large and economical production of popped corn.

Another object of the invention is to provide a corn popping apparatus of this kind which insures a better distribution of the seasoning throughout the popped corn and at the same time prevents a spattering and the attending waste of the seasoning during the corn popping operation.

A further object of the invention is to provide in an apparatus of this kind, a novel bottom for the popping kettle thereof, which predetermines the direction of its expansion under the action of the heat employed for popping and at the same time better disposes the kernels with respect to that area at the bottom having the best popping temperature therein.

Again, it is an object of the invention to provide apparatus of this kind which permits a continuous flow of popped corn from the kettle in a manner removing the weight of the popped kernels from the popping kernels at the kettle bottom and whereby the popping kernels are free to pop into a larger, fluffier, more tender and uniformly seasoned condition.

Again, a further object of the invention is to provide apparatus of this kind which is simple in construction for low cost production, is easy to operate and clean when necessary and which takes up but a minimum amount of space in the establishment in which it is used.

Furthermore, it is an object of the invention to provide an apparatus of this kind having improved agitation arms that function during a corn popping operation to move the corn into the best portion of the popping zone of the associated kettle bottom.

The above mentioned objects of the invention, as well as others, together with the several advantages thereof, will more fully appear as the specification proceeds.

In the drawings:

Fig. 1 is a view in side elevation of a corn popping apparatus illustrating one embodiment of the invention, a portion of the pedestal-like casing being shown in vertical section better to disclose certain parts within the same.

Fig. 2 is a horizontal sectional view through a part of the apparatus as taken on the line 2—2 of Fig. 1.

Fig. 3 is a vertical sectional view on an enlarged scale as taken on the line 3—3 of Fig. 2 and shows the kettle of the apparatus in its popping position.

Fig. 4 is a fragmentary view similar to Fig. 3 and shows the popping kettle in its dumping position.

Fig. 5 is a fragmentary top plan view showing the front side of the popping kettle and its cover.

Fig. 6 is a perspective view on an enlarged scale of a certain coupling element carried by the bottmo of the popping kettle and which will be more fully referred to later.

Fig. 7 is a top plan view, on a reduced scale, of the popping kettle of the apparatus with the cover removed therefrom better to show the arrangement and form of the agitator arms in the kettle.

Referring now in detail to that embodiment of the invention illustrated in the drawings, 10 indicates as a whole the pedestal-like base of the apparatus in the form of an upright hollow rectangular casing embodying therein front and rear walls 11 and 12 respectively and side walls 13—13. At the bottom of the pedestal-like base is a raised bottom wall 14 and toward the top end of the base is a horizontal partition 15 which divides the same into a bottom end drive mechanism compartment 10a and a top end burner or heating element compartment 10b. Horizontally elongated holes 16 are formed in the front wall 11 and in the side walls 13—13 above the partition 15 to provide for the lateral inlet of air into the compartment 10b and an annular row of openings 15a is formed in the partition 15 for the bottom inlet of air into said compartment. The rear wall 12 is made removable from the other walls of the pedestal and is formed toward its bottom end with an extension housing 17, the purpose of which will appear later. In one of the upright walls of the housing is the bottom air inlet opening 17a for the compartment 10a of the casing 10, see Fig. 1. A bar 18 is fixed to the top end of each side wall 13 by means of screws 19 and the front end portions of said bars extend forwardly of the front wall. A rock shaft 20 is journalled in said front end extension of said bars.

In the compartment 10b is located a heating element which in this instance is a burner 21 for gas or other suitable fuel. Said burner is in the form of a ring provided at certain points about its bottom with feet 22 which engage upon and are fixed to the partition 15. The burner 21 which is of such an inside diameter as to encompass the annular row of openings 15a in the partition 15 is provided with a fuel tube 23 that projects through the rear wall 12, where it has a valved connection with a fuel pipe 24. In the top surface of the burner are the usual burner orifices 25. The burner includes a central boss 26 having a vertical passageway 27 and an annular channel 28 and said boss is connected to opposite sides of the burner, in line with the fuel tube 23, by a pair of hollow arms 29—29. This structure is best shown in Figs. 2 and 3. By means of these arms 29 and the annular channel 28, fuel may pass from the inlet side of the ring to the other side thereof so that the fuel is more evenly distributed to the orifices 25 throughout the burner. By reason of the arrangement of the openings 16, 17 and 15a respectively, air to support combustion at the annular burner is provided at the outside and at the inside thereof so that an even burning is assured at all of the burner orifices 25.

The vertical passageway 27 in the boss 26 is located centrally of the pedestal-like base and journalled in and extending through said passageway is an upright shaft 30. The top end of said shaft carries a cross pin 31 and the bottom end of said shaft extends into and is operatively connected to a speed reducing mechanism 32 at the bottom of the pedestal-like base. This mechanism is driven by a motor 33, a part of which is located in the housing 17 at the bottom end of the rear wall 12. It is to be noted from Fig. 1, that air entering the chamber 10a through the inlet opening 17a, passes about and over the motor 33 so as to keep the same in a relatively cool condition.

35 indicates as a whole the popping kettle of the apparatus, which is located in spaced relation above the open top end of the pedestal-like base 10. This kettle is a circular one of a diameter greater than the greatest horizontal dimension of the top end of said base. Said kettle includes an annular relatively thin sheet metal side wall 36 and a relatively thick bottom wall 37. As shown, the side wall flares slightly upwardly and outwardly from the bottom wall and has a top end marginal bead or rolled rim 38. The bottom 37 is a dished or a concaved one, preferably of the same thickness throughout from its center to its peripheral margin where it fits in the bottom end of the wall 36 and is welded thereto.

Toward the front portion of said bottom there is provided a pair of laterally spaced depending arms 40 through which the shaft 20 before mentioned, extends and is securely fixed. Toward the rear end of each side bar 18 there is provided an upright post 41 adapted for supporting engagement by the rear portion of said bottom 37 as best appears in Fig. 3. The post 41 is adjustable in height as provided by a bolt 42 and lock nut 43 so that the bottom can be accurately disposed in a horizontal plane.

A stud shaft 44 is journalled axially in the bottom and carries a top end spider hub 45 which is located in the kettle. Said shaft also carries a bottom end coupling member 46, outside the kettle. This coupling, which best appears in perspective in Fig. 6, is provided with a downwardly opening axial recess 47 of a diameter to receive the top end of the shaft 30 and is also formed with opposed recesses 48—48 in its sides of a width to receive the cross pin 31 carried by the top end of said shaft. The bottom end of one side of each recess 48 is cut away and rounded off to provide a cam surface 49.

Agitator arms 50 are attached to the hub 45 so as to extend tangentially with respect to the axis of the stub shaft 44 and the outer end of each arm is angled to provide a sweep or gatherer part 50a that extends in the general direction of the rotation of said arms as shown by the arrow in Fig. 7. The outer end portions of said arms including the sweep or gatherer parts 50a engage upon the top surface of the kettle bottom 37 while the inner ends of said arms are spaced slightly above said bottom as shown in Fig. 3. With this arrangement as above described, said parts of said arms engage the kettle bottom on a circular zone substantially coincident with the circle of the flames issuing from the burner orifices and function to move the corn onto that part of the kettle bottom producing the most uniform and best popping action.

The front portion 51 of the side wall 36 of the kettle is made shorter in height than the remainder of said side wall but connects therewith by means of inclined edge portion 52 to provide a stepped arrangement at these points. Associated with the top of the kettle is a sectional cover arrangement including a rear section 53, and a mid section 54 for the high part of the kettle, and a front section 55 for the low part of the kettle, the front section including an extension part 56 for closing against the edges 52—52 of the side wall of the kettle. The rear and intermediate cover sections 53 and 54 have their adjacent margins curled over as alternate and intermediate ears 57 to engage upon a pintle rod 58 and the ends of this rod are removably engaged in clip-like bearing ears 59 on opposite sides of the higher part of the side wall. The cover sections just mentioned carry spring finger clips 60 for a snap-on engagement with the bead 38 of that part of the side wall 36 with which they engage.

The extension part 56 for the front cover section 55 and the front margin of the intermediate cover section 54 have their associated margins curled over as alternate and intermediate ears 61 and through which a pintle rod 62 extends, said rod being fixed to the ears 61 on said extension part 56 and turning in those on the intermediate cover section 54. At the ends of the front cover section extension part 56 are bent over flanges or ears 56a which are adapted to cover the inclined edges 52 at opposite sides of the kettle.

One end of the pintle rod 62 has one end of an arm 63 fixed thereto and the other end of said rod has a weight 64 adjustably engaged thereon as by means of a set screw 65. This weight 64 may be so adjusted on said arm that when the cover section 55 is in its closed condition on the short wall part 52, it substantially counterbalances said cover section and normally keeps it closed. When the cover section 55 is swung about the axis of the rod 62 to a slightly open position, the weight 64 is moved into an overbalancing position so as to swing said cover section 55 into the open position shown in dotted lines in Fig. 3.

The kettle 35 may be swung from the popping position shown in Fig. 3 to the dumping position shown in Fig. 4 and back into popping position in a very easy manner. For this movement of the kettle, a lever handle 66 is fixed to one end of the shaft 20 so as to extend therefrom in a downward and rearward direction, as best appears in Fig. 1. By arranging the lever handle in this manner, it is sufficiently remote from the burner so that it may be comfortably grasped for manipulation.

At opposite sides of the front portion of the side wall of the kettle there are provided downwardly and forwardly inclined trough plates 67, the lowermost portion of said plates being connected together by a rod 68. These plates are provided along their inner edges, which are curved to fit the side wall of the kettle, with ears 69 for attaching them to the kettle and are provided along their outer edges with upturned flanges 70.

Assume that the burner 21 is in operation and that the kettle 35 is disposed in its popping position as appears in Figs. 1 and 3, and that the motor 33 has been energized to drive the shaft 30. When the kettle is in popping position, the coupling element 46 is operatively engaged with the top end of the shaft 30 so as to drive the agitator arms 50. At this time, the top end extremity of the shaft 30 is disposed in the lower portion of the recess 47 and the ends of the cross pin are engaged in the lower portion of the recesses 48 of said coupling element.

Now assume that the bottom 37 of the kettle has been brought to popping temperature and that it is desired to charge the kettle for a popping operation. By swinging the weight carrying arm 63 downwardly (clockwise when viewed in Fig. 1) the cover section 55 will be swung into its open position. Because of the substantially counterbalancing relation between the cover section 55 and the arm 63 and its weight, a slight touch on said arm will accomplish this operation as the arm and its weight will overbalance said cover section and will swing it into the full open position. With this cover section open, a quantity of seasoning and salt is placed in the kettle and thereafter the proper amount of corn kernels is placed in the kettle. This cover section 55 is then closed and soon thereafter the corn starts popping. In the initial part of this operation the popping corn will produce a spattering of the seasoning. As the kettle is relatively deep throughout its major portion and is provided with the cover structure mentioned, the spattered seasoning is retained in the kettle. Therefore, there is no waste thereof and the outside of the kettle and adjacent surroundings is maintained in a clean condition.

As the corn pops it increases in volume. When the volume is such as to engage the cover section 55, it will raise said section into a position wherein the weight 64 overbalances the same so as to throw it into an open position. As the volume of popped corn further increases, it will overflow the top edge of the lower side wall portion at the front of the kettle, falling onto the trough plates 67 and down which the popped corn will flow for discharge into a suitable container arranged to catch the same.

As the cover section opens automatically substantially as soon as the volume of popped corn builds up to the plane thereof, the very slight pressure of the cover section is immediately released so that the corn kernels on the pan bottom are free to expand as they pop into relatively large size. This action is apparent because the only resistance afforded is the blanket of popped corn that is moving out of the kettle at the front thereof.

It is pointed out at this time that the dished or concaved cross section of the bottom of the kettle has several advantages. Under the action of the heat applied to the kettle bottom for the popping operation, said bottom will tend to expand. This expansion can take place more readily in a downward direction. As the bottom moves downward, the coupling element 46 will likewise move downwardly and this is accommodated by the provision of those parts of the recesses 47—48 thereof above the top extremity of the shaft 30 and above the cross pin 31 thereof. Thus, the bottom of the kettle cannot buckle out of shape because its cross sectional character determines the direction of movement under expansion, and the coupling member 46 will not tend to bind upon the top end of the shaft, because of the vertical play afforded thereby with respect to said top end of said shaft.

Another advantage obtained by the use of a kettle bottom of this kind is that the air entering the burner chamber 10b through the openings 15a and 16 will pass upwardly with respect to the burner ring and will impinge against the underside of said bottom. The bottom will direct this air outwardly with a radial draft action in all directions and will carry the flames of the burning fuel issuing from the orifices in the burner ring, radially outward in all directions to impinge as a ring against the underside of the bottom as indicated in Fig. 2. With this arrangement the central portion of the bottom will remain relatively cool compared to the outer peripheral portion of the bottom so that the bearing for the agitator shaft 44 in said bottom will remain free, thus avoiding seizure which might result in breakage.

It is pointed out that by reason of bottom construction described, the central portions of the agitator arms 50 are free from said bottom while the outer end portions of said arms wipe over the upper face of the peripheral margin of said bottom. As the outer ends of said arms including the sweeping or gathering parts 50a thereof move faster than the inner ends thereof, the tendency is to maintain the unpopped kernels in that annular area of the pan bottom against which the flames from the burner ring impinge. Thus there is less popping action at the central part of the bottom than toward said annular area so that said central area will operate as a relief area to accommodate an excess of volume unable to spill out through the open front part of the kettle.

By reason of the provision of the hollow arms 29 and the passage 28, the fuel entering the burner ring 21 from the tube 23 is more evenly distributed about the ring and by reason of the arrangement of the openings 15a, 16 and 17 respectively, the flames produced by the burning fuel issuing from the orifices of the ring are more even, thus resulting in a uniform heating of the bottom 37.

At the end of the popping operation, the operator grasps the handle lever 66 and swings the same upwardly from the position shown in Fig. 1. As the lever and the popping kettle are both fixed to the shaft 20, the kettle is swung into the dumping position shown in Fig. 4 and wherein a part of the kettle engages against a bumper 71 on the front wall as appears in Fig. 4.

It is pointed out that the discharge opening for the kettle is at the lowest point thereof when the kettle is in dumping position. As the intermediate and rear cover sections remain upon the kettle a part of the popped corn will flow down the same discharging through the discharge opening. When the kettle is in dumping position, the weight 64 on the arm 63 will hold the cover section 55 in its wide open position.

To return the kettle to popping position, the lever handle 66 is swung clockwise back into the position shown in Fig. 1. In this position the lever is considerably below the top of the pedestal and will remain relatively cool. As the kettle approaches the popping position, the recess 47 in the coupling element 46 will register with the top end of the shaft 30 so that said shaft enters the same. Should the end of the coupling element happen to engage upon the cross pin 31, the ends of said pin in the rotation of the shaft 30 will follow the cam corners 49 of said element to find their way into the recesses 48 at which time a driving connection is again established between the agitator arms 50 and the shaft 30.

The apparatus is of simple sturdy construction so as to be dependable in operation and yet be fast in the production of large volumes of popped corn at a minimum cost.

While in describing the invention, I have referred in detail to the form, arrangement and construction of the various parts, the same is to be considered only in the illustrated sense so that I do not wish to be limited thereto except as may be specifically set forth in the appended claims.

I claim as my invention:

1. In a corn popping apparatus, the combination of a popping kettle, a hinged cover section closing a portion only of the kettle and which cover section may be swung into an open position, and means connected to said cover section and operating after the increasing volume of the popped corn has initiated an opening of the cover section, automatically to impart the final portion of the opening movement to said cover section.

2. In a corn popping apparatus, the combination of a popping kettle, a hinged cover section closing a portion of the kettle and which cover section may be swung into an open position, and a weight operatively connected to said cover section and operating after the increasing volume of the popped corn has initiated an opening of the cover section, automatically to complete the opening movement of said cover section.

3. In a corn popping apparatus, the combination of a popping kettle having a bottom, closure means for said kettle and including cover portions arranged at high and low elevations with respect to said bottom, means providing a hinged connection between said cover portion of low elevation and said kettle whereby said last mentioned cover section may be swung into an open position, and means connected to said last mentioned cover portion and operating after the increasing volume of popped corn in the kettle has initiated an opening movement of said cover portion to automatically complete the opening movement of said last mentioned cover portion.

4. In a corn popping apparatus, the combination of a popping kettle that may be swung from a popping position to a dumping position, a hinged cover section closing a portion only of said kettle and which cover section may be swung into an open position when said kettle is in popping position, and means connected to said cover section and operating after the increasing volume of popped corn has initiated an opening of the cover section automatically to impart the final part of the opening movement to said hinged cover section when said kettle is in popping position, said last mentioned means being operative to retain the cover section in open position as said kettle is swung from popping position to dumping position.

5. In a corn popping apparatus, the combination of an open top popping kettle, a cover for said open top of said kettle and including a plurality of hingedly connected together cover sections, means carried by certain of said cover sections for detachably securing them to said open top of the kettle to close the same, the remaining cover section being capable of being partially opened by the increasing volume of the popped corn as the latter engages the same, and means connected to said last mentioned cover section and operating after the latter has been partially opened, to swing it into its full open position.

6. In a corn popping apparatus, the combination of a popping kettle having a cover part which opens under the action of the increasing volume of popped corn in the kettle so as to overflow from said kettle, and means on the outer surface of side wall portions of the kettle and extending downwardly and forwardly from opposite sides of said side wall portions toward the middle thereof and there spaced apart for catching and directing the overflowing popped corn into a container or the like.

7. In a corn popping apparatus, the combination of a popping kettle having a cover part which opens under the action of the increasing volume of popped corn in the kettle so as to overflow from said kettle, and a downwardly and forwardly extending member on each side of a said wall portion of the kettle and having upwardly extending flange portions, said members being spaced apart at a point between and coacting with said wall portions in forming a trough for catching and directing the overflowing popped corn into a container or the like.

8. In a corn popping apparatus, the combination of an open top kettle, a cover for said open top of said kettle and including a plurality of cover sections having a hinged connection when engaged on said open top of said kettle, one of said cover sections being capable of being partially opened by the increase in volume of the popped corn as the latter engages the same, and means connected to one of said cover sections and operative after the latter has been partially opened, to swing said cover section into its full open position.

9. In a corn popping apparatus, the combination of a popping kettle having a bottom, rotatable agitator means in the kettle in operative relation with respect to said bottom, an annular burner arranged below said bottom and formed for the passage of air upwardly through and within the margin of the same, means providing a chamber in which said burner is located and which chamber is closed at the bottom and is open at its sides for the admission of air into said chamber to support combustion at the burner, the bottom surface of said bottom being so formed that air passing upwardly through said burner directs the products of combustion from said burner radially outward to impinge against an annular area of said surface spaced radially outward from the axis of rotation of said agitator means.

CHARLES J. CRETORS.